Jan. 16, 1940.    R. C. BAKER    2,187,480
WELL CEMENTING APPARATUS
Filed Dec. 12, 1938    2 Sheets-Sheet 1
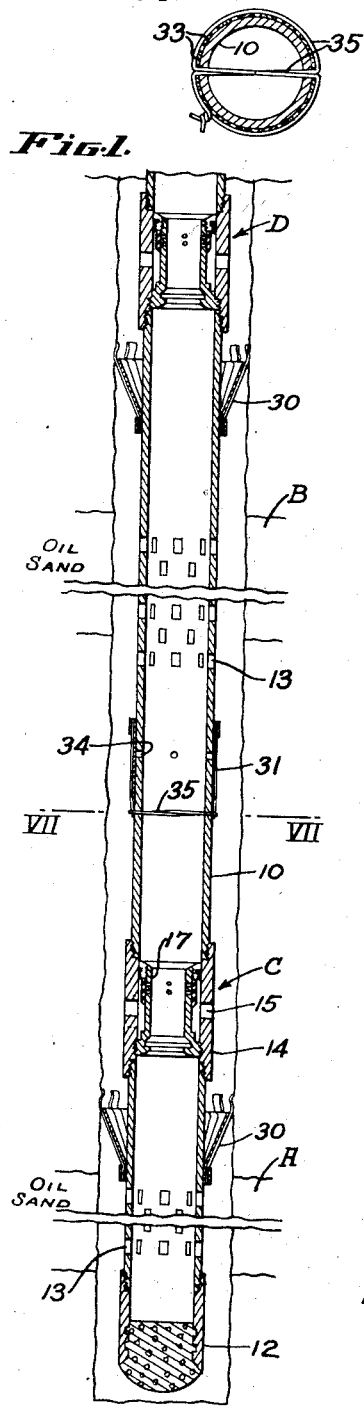
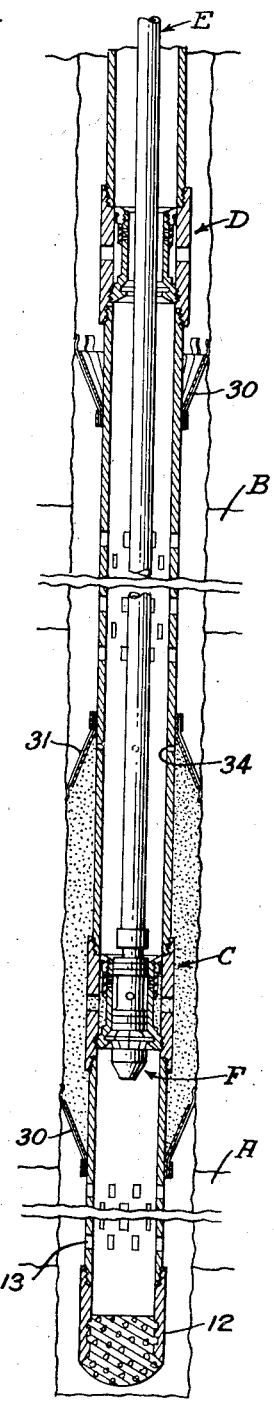
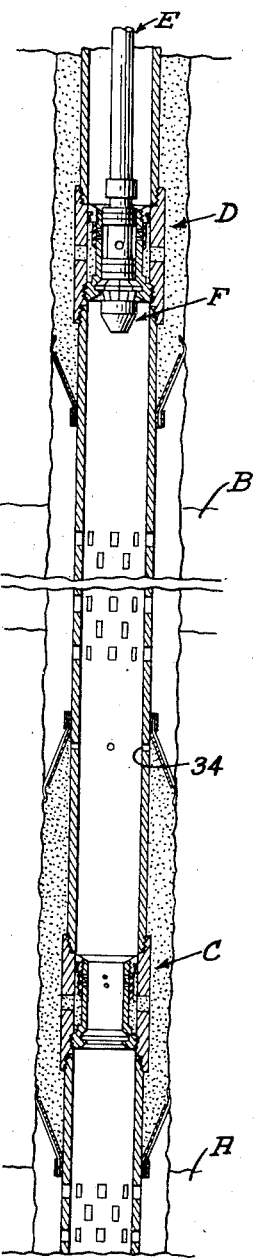
INVENTOR.
REUBEN C. BAKER
BY Oscar A. Mellin
ATTORNEY Jan. 16, 1940.   R. C. BAKER   2,187,480
WELL CEMENTING APPARATUS
Filed Dec. 12, 1938   2 Sheets-Sheet 2

INVENTOR.
REUBEN C. BAKER
BY Oscar A. Mellin
ATTORNEY

Patented Jan. 16, 1940

2,187,480

UNITED STATES PATENT OFFICE 2,187,480

WELL CEMENTING APPARATUS

Reuben C. Baker, Coalinga, Calif., assignor to Baker Oil Tools, Inc., Huntington Park, Calif., a corporation of California Application December 12, 1938, Serial No. 245,238

10 Claims. (Cl. 166—1)

This invention relates to well cementing apparatus having particular utility in the placing of cement in the annular space between the wall of a well bore and a casing or liner disposed in said bore and of the type diclosed in my copending application Serial No. 269,135.

In the drilling of deep wells, and particularly in the drilling of oil wells, it is common practice to cement in a well bore a water string of casing or a liner in order to obtain a water shut-off. There are many instances, especially where more than one oil bearing strata is encountered, when it is desirable to secure such a water shut-off at several separate locations along such casing or liner by ejecting separate charges of cement laterally through discharge ports formed in the casing or liner wall at vertically spaced points or stations, in the accomplishment of what may aptly be termed series or multiple stage cementing. Such series cementing may be employed to entirely cement in a casing string, or to cement above and below a productive formation to protect such formation until such a time as it is desired to produce therefrom. Such series cementing may be employed to cement a liner which is perforated at intervals relatively spaced to correspond with the depths and extent of two or more known productive strata, so as to prevent an encroachment of water into said productive strata. In fact, it may be employed in any situation where series or stage cementing is required or is desirable.

It is the principal object of the present invention to provide an improved apparatus capable of use in cementing a well bore at vertically spaced intervals for the protection of productive formations against the encroachment of migratory water, or for the purpose of blocking off one or more such formations to protect and conserve the oil content thereof for subsequent production.

In practicing my invention, I preferably incorporate in the casing or liner a plurality of cement discharge devices disposed vertically at selected intervals along the length thereof and constituting successive discharge points or stations at which the cement slurry is to be ejected, and further, said casing or liner is provided with external cement retaining means initially capable of passing downwardly into the well bore and subsequently functioning to define the upper and lower limits of each cementing zone. With the casing or liner properly positioned in a well bore, it is my purpose to first circulate the well drilling fluid to flush from the well bore drilling detritus or other substances which may tend to interfere with the subsequent cementing operations, and to then perform the several cementing operations in upward progressive sequence, all by means of a single tubing string under the manipulative control of an operator at the well surface.

One form which the invention may assume is exemplified in the following description and illustrated by way of example in the accompanying drawings, in which:

Fig. 1 is a vertical section through a portion of a well bore and the liner or casing therein and illustrating the condition of the liner or casing when it is first positioned in the well.

Fig. 2 is a similar vertical section illustrating the first cementing operation and showing a preferred type of cementing string which has been lowered into the well and manipulated from the wel surface to bring its terminal cementing mandrel into cooperative engagement with a lower cement discharge device which forms a part of the liner.

Fig. 3 is a similar vertical section illustrating the second cementing operation, the cementing string having been elevated for cooperative engagement with the second cement discharge device of the liner.

Fig. 7 is a somewhat enlarged section taken on the line VII—VII of Fig. 1.

Figure 4:
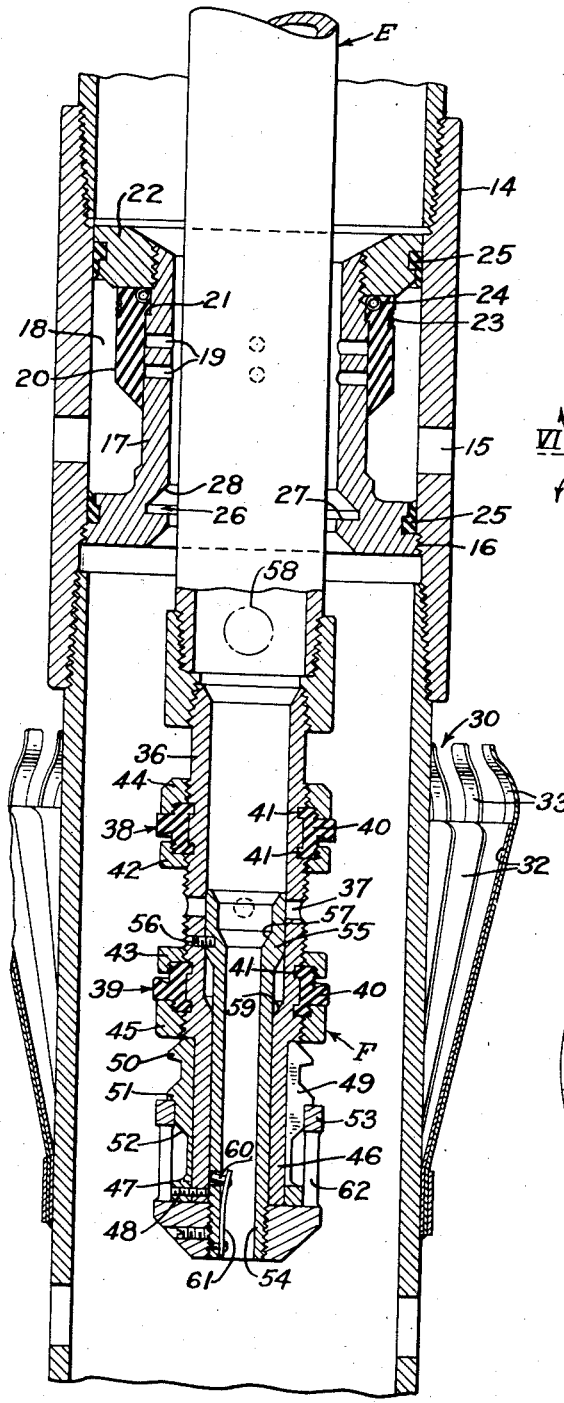
Fig. 4 is an enlarged vertical section of the liner at a cementing station thereof and illustrating the cementing string as it is first lowered through the several cement discharge devices to bring its mandrel below the lowermost thereof and showing the latch means of said mandrel retained in initial inactive condition.

In the accompanying drawings I have shown one form of an apparatus embodying the features of the present invention, and have illustrated its use in the series or stage cementing of a perforated liner passing through more than one productive strata.

In Fig. 1 the liner 10 is shown as lowered to its proper position in the well bore 11, the lower end thereof being preferably provided with a bull-plug casing shoe 12 to facilitate the running in of the liner. In this view is designated two productive strata A and B, the respective depths and extent of which have been previously ascertained during the drilling of the well bore. In the regions of such productive strata the liner is perforated to form a production screen 13 at each strata. Generally, it is desirable to cement above and below each productive strata and to this end the liner has incorporated therein relatively spaced cementing means disposed at locations dependent upon the relative positions and extent of the several productive strata. However, it is desired to point out that the number and relative disposition of the several cement discharge stations may be varied, depending upon the water conditions, the number of productive strata encountered, and the judgment of the operator.

The several cementing devices of the casing or liner are of duplicate construction, each comprising a cylindrical coupling member or casing collar 14 which is connected between adjacent pipe lengths and therefore forms a rigid part of the complete liner or casing. This collar 14 is provided with lateral cement discharge ports 15 disposed to discharge the cement into the annular space between the liner and the wall of the well bore. Mounted fixedly within the bore of said coupling member, by screw-threads as at 16, or otherwise, is a stop sleeve 17 (in Fig. 4) formed to provide an intermediate annular valve chamber 18 between said sleeve and the wall of the coupling member 14. The annular wall of this stop sleeve is provided with one or more transverse rows (two rows being shown in the drawings) of holes constituting passages 19 affording communication between the inner bore of the stop sleeve 17 and the annular valve chamber 18.

For the purpose of controlling the flow of cement through the passages 19, I provide a back-pressure valve 20 which functions to prevent reverse flow of the cement. Although other specific forms of back-pressure valves may be employed for this purpose, I preferably use a sleeve type of valve comprising a flexible sleeve formed of rubber or other suitable resilient material and disposed within the valve chamber 18 in position to surround the stop sleeve 17. The upper portion of the valve 20 has an internal bead which is retained between an external shoulder 21 on the stop sleeve 17 and a removable bushing 22 screw-threaded on the upper end of the stop sleeve, and is securely fastened to said sleeve by being wired thereto as at 23. The upper portion of the valve sleeve is thus securely anchored above the passages 19 with the free skirt portion thereof normally lying in close contact with the stop sleeve and extending downwardly to close the several passages 19. If desired, the upper bead portion of the valve may be reinforced by having moulded in the material thereof a circular coil spring 24. The purpose of making the bushing 22 as a separate member detachable from the stop sleeve 17 is to facilitate assembling of the valve in its proper position.

Since it is quite essential that there be no leakage of cement from the valve chamber 18 along the wall of the coupling member 14, the lower flanged portion of the stop sleeve 17, and the bushing 22, are each provided with suitable packing rings 25.

The opposite ends of the bore of the stop sleeve unit are chamfered or beveled outwardly for a purpose to be later described. Closely adjacent the lower beveled end of said bore the sleeve 17 is provided with an internal annular groove 26 forming a transverse stop shoulder 27 and an upper angled wall 28. The several stop sleeves 17 and their associated bushings 22 are made of aluminum or other readily drillable material so that they may be drilled out after the cementing job is completed and the cement sets, and after a water test and such other tests as are necessary or desirable have been conducted.

Surrounding and carried by the liner or casing 10 and disposed in the annular space between said liner and the wall of the well bore, I provide cement retaining means 30 and 31 respectively positioned below and above each point of cement discharge. Such means serve to define the extent of each cementing zone by arresting the downward and the upward flow of the cement in said annular space, and although other types of cement retaining means may be employed for this purpose, it is considered preferable to use the more or less well known expansible basket type of retaining means, the cement retaining baskets shown in the drawings being of a form generally referred to as "petal" baskets. Each of these baskets 30 and 31 have their closed or small ends securely attached to the liner 10. Their side walls are formed of a plurality of vertically extended, laterally overlapping thin petal-like members 32, see Fig. 4. The "petals" circularly overlap each other to a degree sufficient to permit expansion and contraction of the basket and to at all times maintain, in effect, a substantially continuous side wall. The "petals" of each basket are reinforced by a like number of relatively thin vertically disposed leaf springs 33 each secured to one of said "petals" with its free end extended beyond the free end of its companion "petal" and bowed inwardly toward the liner 10. These springs 33 have sufficient outward tension to normally expand the basket into engagement with the wall of the well bore.

It will be noted that each lower cement retaining basket 30 is disposed with its open end facing upwardly so that it will arrest the downward flow of the cement in the annular space while the companion upper basket 31 is reversely disposed in order to limit the upward flow of cement in said annular space. Also, it will be observed that at a point within the upper basket and closely adjacent its fixed end, the liner is bored to provide overflow passages 34 through which excess cement may flow from said annular space and into the liner.

For the purpose of insuring safe passage of the liner down the well bore, the several inverted cement retaining baskets or packers 31 are secured in collapsed condition, preferably by suitable means which project into the bore of the liner in position to be subsequently acted upon by an instrumentality later to be lowered into the liner and functioning to release said inverted baskets prior to the cementing operation. As shown in Figs. 1 and 7, a wire 35 of relatively soft metal is threaded through diametrically opposite apertures in the liner wall, and, passing between adjacent leaf springs 33 and below the basket "petals" 32, is wound around the several springs to hold the basket in collapsed condition, the opposite ends of said wire being twisted together.

A liner or water-string constructed and conditioned as above described is lowered into the well bore where it will be retained in proper position by any of the well known means usually employed for this purpose.

In carrying forward the cementing operation, I utilize a cementing string of tubing adapted to be lowered into the well to first sever the wires 35 associated with the reversed basket packers 31 and to thereafter be manipulated by an operator at the well surface, for cooperation with the several cementing devices in upward progressive sequence. The cementing string preferably comprises a tubing line E extending to the well surface and provided at its lower end with a cement discharge device F which, although functionally a portion of the cementing string and structurally constituting the lower section thereof, will herein be separately referred to as a cementing mandrel.

This mandrel F is rigidly secured to the lower end of the tubing line E in any suitable manner and comprises a tubular body 36 which is provided with transverse discharge passages 37 and with upper and lower external packing rings 38 and 39, respectively, disposed above and below said discharge passages. Various types of packing rings may be used and various forms of means may be employed for retaining them in place. However, I prefer to use the arrangement herein disclosed, in which rubber packing rings, each having an external medial annular lip 40 and marginal internal annular beads 41, are disposed with the beads thereof engaged in companion grooves formed in the mandrel body 36. These packing rings are retained in place by inner retaining collars, 42 and 43 respectively, screw-threaded on the body 36 and each having an internally threaded side wall with said threads embedded into the body of its companion packing ring, and by opposed retaining collars, 44 and 45 respectively, of similar construction.

Figure 5:
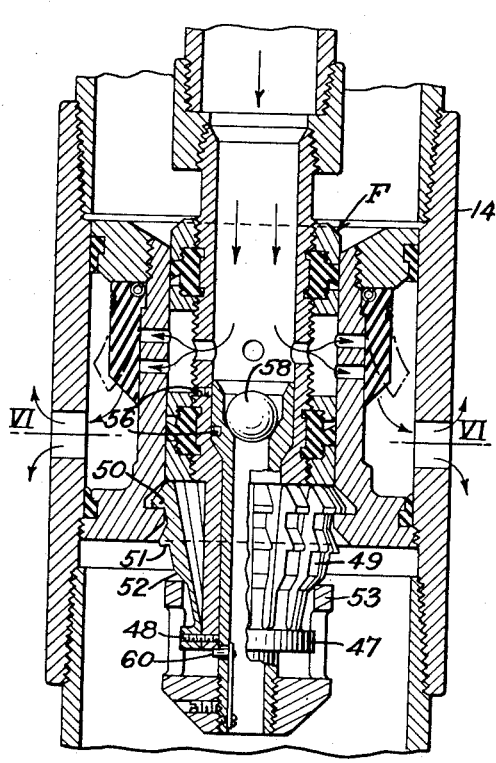
Fig. 5 is an enlarged vertical section showing the cement string mandrel in cooperative engagement with one of the cement discharge devices of the liner and in condition for a cementing operation.
Figure 6:
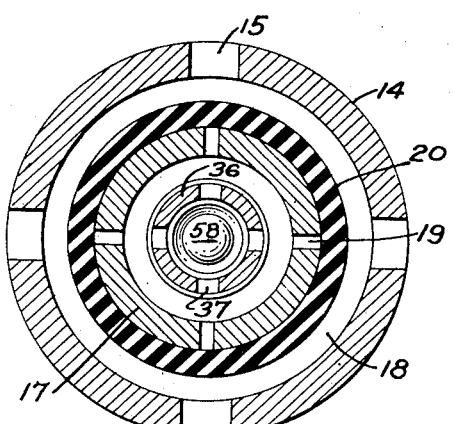
Fig. 6 is a transverse section taken on the line VI—VI of Fig. 5.

The lower end portion 46 of the body 36 is of reduced diameter and is surrounded by a latch device which includes a ring member 47 secured to the lower end of the body portion 46 by a screw 48, or otherwise, and a plurality of resilient latch pawls 49 projecting upwardly therefrom and having a normal tendency to expand to the latching position shown in Fig. 5. The several latch pawls 49 are of duplicate form, each having a ratchet tooth 50 at its upper beveled end, a stop shoulder 51 spaced from said tooth, and a beveled cam edge 52 below said stop shoulder. While the several latch pawls may be individual units connected to the ring member 47 in any desired manner, and urged outwardly by any suitable spring means, it is preferable to make the said ring member and the pawls as an integral unit split longitudinally to form the several individual pawls.

Normally the latch pawls are held in collapsed inactive condition by a latch tripping arrangement comprising a pawl restraining sleeve 53 suitably secured to the lower end of a tubular member 54 disposed in bore of the mandrel body 36 and serving not only as a part of the latch tripping means, but also functioning as a sleeve valve controlling the discharge passages 37 of the mandrel. This valve member 54 has an enlarged head 55 and is normally held in its uppermost position with said head closing the discharge passages 37 by a shear screw 56 which, as a retaining means capable of being disabled, serves to retain said valve member in closed position. Also, the member 54 is provided with an internal annular seat 57 formed by an enlargement of the upper end of its bore, said seat being adapted for engagement by a closure means or bridging ball 58 which will be inserted in the cementing line at the well surface and circulated downwardly therein to engage the seat 57 and thus close the bore of the tubular member 54.

With the ball 58 thus in place, continued pumping will build up pressure sufficient to shear the screw 56 and drive the trip member 54 downwardly until its head 55 engages the stop shoulder 59 in the body bore. Such downward movement of the trip member 54 will open the discharge passages 37 and will at the same time move the pawl restraining sleeve 53 downwardly to free the latch pawls 49 which will then move to the expanded position shown in Fig. 5.

To lock this latch tripping means in its actuated position, I provide a trip lock consisting of a lock stud 60 which is disposed in an opening in the wall of the member 54 and is carried by the free end of a leaf spring 61 attached to said member and disposed within the bore thereof. With the tripping device actuated as shown in Fig. 5, the lock stud 60 will be projected below the lower end of the mandrel body and will thus lock the tripping means in this actuated position.

The lower end of the sleeve 53 is tapered to facilitate downward passage of the cementing mandrel through the several cementing devices, and it is for a like reason that the upper inner edge of the stop sleeve 17 of each cementing device is chamfered or angled as shown. Also the side wall of the sleeve 53 is provided with elongated apertures 62 to facilitate a flushing of the latching device by the fluid circulated prior to the cementing operation.

From the above it will be understood that a liner or casing to be cemented in the well bore will be made up to include any required number of stage cementing devices relatively spaced the proper distances apart, and that each of the necessary reversed basket packers will be wired in collapsed condition before the liner or casing is lowered into the well.

As an example of one use of the apparatus, I have illustrated a two-stage cementing operation, showing in Fig. 1 a properly conditioned perforated liner as it is initially positioned within a well bore, there being no inverted basket packer above the uppermost cementing device D since the height of the final cementing is usually controlled within close enough limits by the quantity of cement comprising the batch ejected at such uppermost station. However, it will be obvious that the operator may use an additional packer above the uppermost cementing device, if he so desires.

With the liner 10 in place, the cementing string E, with the latching device of its mandrel F retained in its initial collapsed condition, is run in to pass the mandrel idly through the several cementing devices to a position below the lower cementing device C, as illustrated in Fig. 4. As the mandrel F passes through the liner 10, it will sever the retaining wire 35 of the inverted basket packer 31 (or of all thereof if more than one is employed) and thus release said packer so that it will immediately expand into contact with the wall of the well bore 11. Circulation will then be established through the cementing string E and its mandrel F to flush the apparatus and the well bore free of any drillings, heavy mud, or other substances which may seriously interfere with the subsequent cementing, this desirable condition being readily ascertained by observing the action of the circulation pump and a reading of the pressure gauges thereof. After a free circulation is attained, the operator will send the ball 58 down the cementing string to engage the annular seat 57 and close the bore of the tubular trip member 54. With escape of the circulation fluid from the cementing string thus shut off, the pressure thereof will rapidly increase to exert on the tripping means a downward thrust sufficient to shear the screw 56 and drive the tripping means downwardly to release the several latching pawls for automatic expansion, and to uncover the several discharge passages 37 of the mandrel body, said tripping means being locked in this down position by the trip lock 60. With the discharge passages 37 thus opened, there will be an immediate drop in the pressure within the cementing string above the bridging ball, which pressure drop will indicate to the operator that the latching means is in proper condition to function.

To thereafter condition the apparatus for a first cementing operation, the operator at the well surface will elevate the cementing string E to draw its mandrel F upwardly through the first cementing device C to a position somewhat above said first cementing device, and during such movement and by reason of the cam action between their upper beveled ends of the latch pawls 49 and the angled wall 28 of the groove 26 in the stop sleeve 17, said pawls will idly ratchet past the stop shoulder 27. The cement string will then be slowly lowered until the ratchet teeth 50 of the several pawls 49 enter the groove 26 and engage the annular stop shoulder 27 of the stop sleeve 17 and thus arrest the mandrel F in position to bring its discharge passages 37 into cooperative alignment with the passages 19 of the stop sleeve. This positions the packing rings 38 and 39 above and below said passages 19, as shown in Fig. 5, so as to provide a fluid-tight engagement between the mandrel and the stop sleeve.

It will be pointed out that during the slow downward return travel of the mandrel, the cam edges 52 of the several latch pawls will cooperate with the chamfered or beveled edge of the bore of the stop sleeve 17 to contract the several latch pawls sufficiently to insure their toothed ends entering said bore. Also it will be stated that such pawls and the grooved wall of each stop sleeve form a uni-directional ratchet mechanism which, when in operative condition, will permit unrestricted upward travel of the mandrel and be effective to automatically arrest a return downward travel thereof at definite predetermined points. The arresting of the mandrel at any cementing station by the latching means will be indicated at the well surface by the relieving of weight or strain on the cementing string, and the operator will thus be informed of the proper positioning of the mandrel at the successive cementing stations.

With the mandrel F properly positioned as shown in Fig. 5, the fluid will pass through the passages 37 and 19, past the back pressure valve 20 and through the chamber 18 and the associated ports 15 to discharge into the adjacent annular space between the basket packers 30, 31 which define the first cementing zone, the fluid flushing this cementing zone and escaping into the liner through the overflow passages 34. This re-establishing of the circulation will be indicated to the operator by the resulting drop in pressure, and when the operator is satisfied that the cementing zone has been properly flushed, the cementing of this lower cementing zone will be effected by pumping down the cement string a batch of cement slurry of sufficient volume to completely fill the annular space between the lower pair of basket packers 30—31, the cement slurry flowing through the cementing device C and discharging into said annular space through the ports 15 thereof, as indicated by the flow arrows in Fig. 5, any excess cement overflowing into the liner through the overflow passages 34.

The first cementing operation having been completed, the cementing string will again be elevated to withdraw its mandrel F from the lower cementing device C and position it just above the lower overflow passages 34, and the circulation of flushing fluid continued to clear the cementing mandrel of cement and to wash out any excess cement which overflowed into the liner during the first cementing operation.

The next cementing operation will be effected in substantially the same manner as was the first cementing operation above described; that is, the cementing string will be again elevated to position its mandrel above the second cementing device D, the circulation flushing out the second cementing zone, and the cementing string then being slowly lowered to properly position the mandrel at the second cementing device. A second batch of cement slurry will then be pumped down and discharged into the annular space at said second cementing zone to complete the cementing job at this zone.

After the several cementing operations are completed, the cementing string will be withdrawn from the well and the cement allowed to set. Subsequently, a water test and such other tests as are necessary or desirable may be made and thereafter the several stop sleeves 17 can be drilled out to clear the liner or casing for future producing or in preparation for continued drilling to deepen the well bore.

From the above it will be apparent that I have provided an apparatus by the use of which series cementing may be effectively accomplished at two or more cementing stations in progressive upward sequence.

While the apparatus herein illustrated and described is fully capable of fulfilling the objects and purposes primarily stated, it is to be understood that I do not wish to restrict the invention to the specific embodiment herein disclosed, for it is susceptible of embodiment in various other forms, all coming within the scope of the appended claims.

Having thus described my invention, what I claim and desire to secure by Letters Patent is:

1. In combination with a well casing having a lateral discharge port formed therein, stop means mounted within the casing adjacent said port, a tubular cementing mandrel having a normally open bore and a lateral discharge passage formed in its side wall to communicate with said bore, said mandrel being adapted to be lowered into the casing at the lower end of a string of tubing, a one-way latch on the mandrel adapted to ratchet past said stop means during upward travel of said mandrel and to engage said stop means during downward travel thereof to arrest said mandrel in a cementing position to bring its discharge passage into cementing alignment with the discharge port of the casing, means normally restraining said latch in inactive position to permit an initial lowering of the mandrel past said stop means, tubular valve means normally closing the lateral discharge passage of the mandrel and slidably mounted in the bore thereof and permanently connected with the latch restraining means, means for retaining said valve means in normal position, and tripping means adapted to be sent down the tubing string to close the bore of said valve means to effect a building up of fluid pressure within the tubing string, said pressure increase being effective to disable said retaining means and translate the tubular valve to open the discharge passage of the mandrel and to at the same time trip the latch restraining means.

2. In combination with a well casing having lateral discharge ports in its side wall relatively spaced longitudinally to define successive cementing stations, stop devices within the casing disposed respectively at each cementing station, a cementing mandrel adapted to be lowered into said casing by a string of tubing and provided with a lateral discharge passage, a one-way downwardly effective latch carried by said mandrel, means normally restraining said latch in inactive position to permit an initial lowering of the mandrel past the several stop means, tubular valve means normally closing the discharge passage of the mandrel and slidably mounted in the mandrel bore and permanently connected with the latch restraining means, retaining means for holding said valve means in normal position, and tripping means adapted to be sent down the tubing string to bridge the bore of said tubular valve to effect a building up of fluid pressure within the mandrel, said pressure increase being effective to overcome said valve retaining means and translate said valve to open the discharge passage of the mandrel and by the same movement trip the latch restraining means and thus release said latch for subsequent cooperation with the several stop devices in upward sequence, said one-way latch cooperating successively with the stop means at each casing port, beginning with the lowermost stop means, to ratchet past said stop means as the mandrel is elevated and to arrest a return downward travel of the mandrel to position its discharge passage in cementing alignment with said casing port, before the mandrel is further elevated to the next higher cementing station.

3. A casing adapted to be cemented in a well bore and having a lateral discharge port therein, a tubular stop device secured therein adjacent said discharge port and having a medial portion of reduced external diameter forming, with the casing wall, an annular chamber with which said discharge port communicates, said device having an annular internal groove forming a stop shoulder faced upwardly and being provided with a lateral passage communicating with its bore and with said chamber, and a back-pressure valve disposed in said chamber and normally closing said communicating passage.

4. A casing as defined in claim 3, in which the bore of the stop device is chamfered or beveled at opposite ends and the upper wall of the annular internal groove is beveled upwardly and inwardly.

5. A casing as defined in claim 3, in combination with opposed expansible packers surrounding the casing and mounted thereon respectively below and above said casing port and adapted to engage the wall of a well bore.

6. A structure adapted for use in the cementing of a well casing, said structure comprising a tubular coupling threaded at opposite ends for connection to adjacent lengths of casing and having a lateral discharge port, a tubular stop device secured within said coupling and having a medial portion of reduced external diameter forming, with the coupling, an annular chamber with which said port communicates, said device having an annular internal groove forming a stop shoulder faced upwardly and being provided with a lateral passage communicating with its bore and with said chamber, and a back-pressure valve disposed in said chamber and normally closing said communicating passage.

7. In combination with a string of tubing having near its lower end a lateral discharge passage formed therein, latch means mounted thereon adjacent said passage, means normally restraining said latch means in inoperative position, a tubular valve normally closing the discharge passage of said tubing and slidably mounted in the bore thereof, said tubular valve being operatively connected with said latch restraining means, means for initially retaining said valve in closed position, a bridging element adapted to be sent down the tubing string to close the bore of said tubular valve to effect a building up of fluid pressure in the tubing string, said pressure increase being effective to disable the valve retaining means and translate said valve to open the discharge passage and at the same time trip the latch restraining means, and means for locking said valve and said latch restraining means in actuated positions.

8. A cementing mandrel adapted for attachment to the lower end of a string of tubing, said mandrel comprising a tubular body having a lateral discharge passage, latch means mounted on said body, means normally restraining said latch means in inactive position, a tubular valve normally closing said discharge passage and slidably mounted within the bore of said body and permanently connected with the latch restraining means, and means for retaining said valve in closed position, the bore of said tubular valve being formed for closure by a bridging element to be sent down the tubing string.

9. A cementing mandrel adapted for attachment to the lower end of a string of tubing, said mandrel comprising a tubular body having a lateral discharge passage, opposed packing rings mounted on the body and disposed respectively below and above said discharge passage, latch means mounted on said body, means normally restraining said latch means in inactive position, a tubular valve normally closing said discharge passage and slidably mounted within the bore of said body and permanently connected with the latch restraining means, and means for retaining said valve in closed position, the bore of said tubular valve being formed for closure by a bridging element to be sent down the tubing string.

10. A cementing mandrel adapted for attachment to the lower end of a string of tubing, said mandrel comprising a tubular body having a lateral discharge passage, opposed packing rings mounted on the body and disposed respectively below and above said discharge passage, a circular series of resilient one-way latch pawls mounted on and surrounding the lower end of said body and disposed longitudinally thereof, a sleeve surrounding said pawls and normally restraining them in inactive condition, a tubular valve normally closing said discharge passage and slidably mounted in the body bore and extended downwardly to connect with said pawl restraining sleeve, a shear element initially retaining the tubular valve and its associated sleeve in normal position, and lock means for locking said valve and sleeve in actuated position, the bore of said tubular valve being formed for closure by a bridging element to be sent down the tubing string.

REUBEN C. BAKER.